US012607644B2

(12) United States Patent
Addihalli Narayana et al.

(10) Patent No.: US 12,607,644 B2
(45) Date of Patent: Apr. 21, 2026

(54) LABORATORY SAMPLE CONTAINER HANDLING APPARATUS, LABORATORY AUTOMATION SYSTEM, AND USE

(71) Applicant: Roche Diagnostics Operations, Inc., Indianapolis, IN (US)

(72) Inventors: Avinash Addihalli Narayana, Stuttgart (DE); Michael Rein, Fellbach (DE)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 714 days.

(21) Appl. No.: 18/061,717

(22) Filed: Dec. 5, 2022

(65) Prior Publication Data

US 2023/0184796 A1     Jun. 15, 2023

(30) Foreign Application Priority Data

Dec. 15, 2021     (EP) ..................................... 21214626

(51) Int. Cl.
   *G01N 35/02*        (2006.01)
   *G01N 35/04*        (2006.01)
   (Continued)

(52) U.S. Cl.
   CPC ........... *G01N 35/025* (2013.01); *G01N 35/04* (2013.01); *B01L 9/00* (2013.01); *G01N 35/00732* (2013.01);
   (Continued)

(58) Field of Classification Search
   CPC .................. G01N 35/025; G01N 35/04; G01N 35/00732; G01N 2035/0429;
   (Continued)

(56) References Cited

U.S. PATENT DOCUMENTS

2017/0131309 A1*  5/2017  Pedain .................. B65G 54/02
2018/0321268 A1* 11/2018  Schacher ................ B25J 18/04

FOREIGN PATENT DOCUMENTS

EP        0565166 B1    11/1998
EP        2908139 A2     8/2015
            (Continued)

OTHER PUBLICATIONS

European Search Report issued May 25, 2022, in Application No. 21214626.0, 2 pp.

*Primary Examiner* — Benjamin R Whatley

(74) *Attorney, Agent, or Firm* — Woodard, Emhardt, Henry, Reeves & Wagner, LLP

(57)         ABSTRACT

A laboratory sample container carrier handling apparatus is provided comprising a revolving device, a guiding surface, and a force-applying device, wherein the force-applying device is adapted to apply a force to a laboratory sample container carrier supplied to the revolving device to such an extent that the laboratory sample container carrier is forced against the guiding surface to such an extent that the laboratory sample container carrier rolls off at the guiding surface pushed by the revolving device. A laboratory automation system is also provided comprising such a laboratory sample container carrier handling apparatus and to a use of such a laboratory sample container carrier handling apparatus for handling a laboratory sample container carrier in, in particular such, a laboratory automation system.

25 Claims, 4 Drawing Sheets

(51) Int. Cl.

*B01L 9/00* (2006.01)

*G01N 35/00* (2006.01)

(52) U.S. Cl.

CPC ................ *G01N 2035/0429* (2013.01); *G01N 2035/0439* (2013.01); *G01N 2035/0441* (2013.01); *G01N 2035/0477* (2013.01); *G01N 2035/0489* (2013.01)

(58) Field of Classification Search

CPC ... G01N 2035/0439; G01N 2035/0441; G01N 2035/0477; G01N 2035/0489; G01N 2035/0444; B01L 9/00

See application file for complete search history.

(56) References Cited

FOREIGN PATENT DOCUMENTS

| | | | |
|---|---|---|---|
| EP | 3432004 A1 | 1/2019 | |
| EP | 3456415 A1 | 3/2019 | |
| EP | 2773968 B1 | 3/2020 | |
| EP | 3912726 A1 | 11/2021 | |
| WO | 2013/004430 A1 | 1/2013 | |
| WO | WO-2013064665 A1 * | 5/2013 | ............. G01N 35/04 |
| WO | 2015/171851 A1 | 11/2015 | |

* cited by examiner

LABORATORY SAMPLE CONTAINER HANDLING APPARATUS, LABORATORY AUTOMATION SYSTEM, AND USE

CROSS-REFERENCE TO RELATED APPLICATIONS

This application claims priority to European Patent Application No. 21214626.0, filed 15 Dec. 2021, the disclosure of which is hereby incorporated by reference in its entirety.

TECHNICAL FIELD

The disclosure relates to a laboratory sample container carrier handling apparatus, to a laboratory automation system comprising such a laboratory sample container carrier handling apparatus, and to a use of such a laboratory sample container carrier handling apparatus for handling a laboratory sample container carrier in, in particular such, a laboratory automation system.

SUMMARY

Although the embodiments of the present disclosure are not limited to specific advantages or functionality, it is noted that in accordance with the present disclosure, a laboratory sample container carrier handling apparatus is provided that enables an easy handling of a laboratory sample container carrier and/or a laboratory sample container, and a laboratory automation system comprising such a laboratory sample container carrier handling apparatus for use of such a laboratory sample container carrier handling apparatus for handling a laboratory sample container carrier in, in particular, such a laboratory automation system.

In accordance with one embodiment of the present disclosure, a laboratory sample container carrier handling apparatus is provided comprising: a revolving device, a guiding surface, and a force-applying device, wherein the guiding surface comprises an open ring shape partially surrounding the revolving device circumferentially, wherein the revolving device is adapted to push a laboratory sample container carrier supplied to the revolving device along the guiding surface, and wherein the force-applying device is adapted to apply a force to the laboratory sample container carrier supplied to the revolving device to such an extent that the laboratory sample container carrier is forced against the guiding surface to such an extent that the laboratory sample container carrier rolls off at the guiding surface pushed by the revolving device.

In accordance with another embodiment of the present disclosure, a laboratory automation system is provided, wherein the laboratory automation system comprises: a laboratory sample distribution system, and the laboratory sample container carrier handling apparatus according to an embodiment of the disclosure, wherein the laboratory sample container carrier handling apparatus is coupled to the laboratory sample distribution system.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which.

Figure 1:
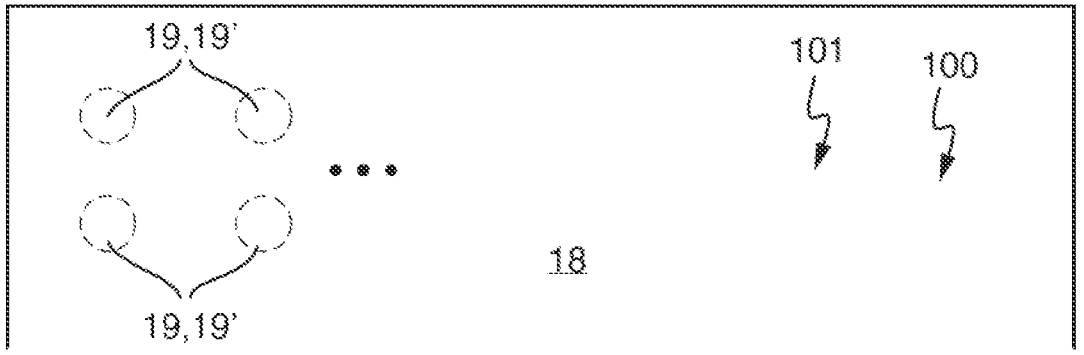
FIG. 1 schematically depicts a top view of a laboratory automation system according to the disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiment(s) of the present disclosure.

DETAILED DESCRIPTION

The disclosure relates to a laboratory sample container carrier handling apparatus. In particular the laboratory sample container carrier handling apparatus may be adapted to be coupled to a laboratory sample distribution system, in particular being adapted to distribute a, in particular round, laboratory sample container carrier being adapted to carry a, in particular open, laboratory sample container being adapted to contain a laboratory sample. The laboratory sample container carrier handling apparatus comprises a revolving device, a, in particular lateral, guiding surface or wall, respectively, and a force-applying or -biasing, respectively, device. The guiding surface comprise an open ring shape, in particular only, partially surrounding the revolving device circumferentially or laterally or outside, respectively. In particular, the guiding surface may be adapted to guide the laboratory sample container carrier. The revolving device is adapted to push or move, respectively, the laboratory sample container carrier, in particular while, supplied to the revolving device, in particular partially, along or in contact with, respectively, the guiding surface. The force-applying device is adapted to apply a force to the laboratory sample container carrier, in particular while, supplied to the revolving device to such an extent that the laboratory sample container carrier is forced against the guiding surface, in particular in contact with the guiding surface, to such an extent that the laboratory sample container carrier rolls off at or on, respectively, the guiding surface, in particular while, pushed by the revolving device.

This enables a defined or reproducible, respectively, in particular automatic, rotation of the laboratory sample container carrier around itself or its own center, respectively, and, thus, of the laboratory sample container, in particular while carried by the laboratory sample container carrier. Thus, this enables a defined or reproducible, respectively, in particular automatic, orientation or alignment, respectively, of the laboratory sample container carrier and/or the laboratory sample container, in particular while carried by the laboratory sample container carrier, e.g., for a laboratory sample container take over apparatus and/or an optical reader. Thus, this enables an easy handling of the laboratory sample container carrier and/or the laboratory sample container, in particular while carried by the laboratory sample container carrier.

In particular, the laboratory sample container carrier handling apparatus may be denoted as carousel.

The laboratory sample container carrier may be circular and or comprise a round, in particular circular, shape or cross-section, respectively, in particular where in contact with the revolving device and/or the guiding surface and/or in top view. Additionally or alternatively, the laboratory sample container carrier may be comprised by the laboratory sample container carrier handling apparatus.

The laboratory sample container may be open at its top. Additionally or alternatively, the term "uncapped" may be used synonymously for the term "open". Additionally or alternatively, the laboratory sample container may be a tube.

The laboratory sample may be a, in particular body, liquid or fluid, respectively, in particular a blood sample.

The revolving device may be motor-driven. Additionally or alternatively, the term "star rotator" or "star wheel" may be used synonymously for the term "revolving device". Additionally or alternatively, the revolving device may comprise a number (e.g., between 5 and 20) of pushing cavities or compartments, respectively, being adapted to receive the laboratory sample container carrier to be rotated and to push the received laboratory sample container carrier. Thus, each laboratory sample container carrier may have its own cavity. In particular, a respective pushing cavity may comprise two side walls, wherein the side walls may rotate around the center or an axis of rotation, respectively, of the revolving device, wherein a side wall may push the laboratory sample container carrier being in contact with the side wall. In particular, the side walls may contact each other along the axis of rotation of the revolving device. This may be regarded with respect to actually visible side walls, or also with respect to lines that may be used in order to define dimensions of the cavities. Additionally or alternatively, the revolving device may be adapted to push the laboratory sample container carrier from an entry position to an exit position in a circumferential direction. Additionally or alternatively, the entry position may be a position at which the laboratory sample container carrier may be supplied to or received by the laboratory sample container carrier handling apparatus, in particular, the revolving device. Additionally or alternatively, the exit position may be a position at which the laboratory sample container carrier may be supplied or transferred by or received from the laboratory sample container carrier handling apparatus, in particular, the revolving device.

The revolving device and/or the guiding surface may be adapted such that, in particular the, one laboratory sample container carrier may be at the entry position or enter the revolving device and/or the guiding surface, respectively, and another one laboratory sample container carrier may be at the exit position or exit the revolving device and/or the guiding surface, respectively, at the same time or simultaneously, respectively.

The guiding surface or its open ring shape, respectively, may surround the revolving device in a radial direction, in particular, non-parallel, in particular, orthogonal, to the circumferential direction. Additionally or alternatively, the guiding surface may be continuous in the circumferential direction. Additionally or alternatively, the term "guiding arch" or "alignment surface" may be used synonymously for the term "guiding surface".

The term/s "has/have" may be used synonymously for the term/s "comprise/s".

The term "encompass" may be used synonymously for the term "surround".

The term "configured" may be used synonymously for the term "adapted".

The contact may be a direct and/or a physical contact. Additionally or alternatively, the term "touch" may be used synonymously for the term "contact".

The term "in such a way" may be used synonymously for the term "to such an extent".

The laboratory sample container carrier may roll off at the guiding surface or rotate, respectively, due to the contact, in particular, a friction, between the laboratory sample container carrier and the guiding surface, in particular, due to the applied force. Additionally or alternatively, the applied force may be different, in particular, of a different kind, from a centrifugal force, in particular, due to the pushing by the revolving device. Additionally or alternatively, the revolving device, the guiding surface and/or the force-applying device and/or their functions may be different, in particular, of different kinds, from each other.

The force-applying device may adapted to apply the force in a, in particular the, radial direction, in particular from, in particular a center of, the revolving device to the guiding surface.

The force-applying device may adapted to apply the force such that the laboratory sample container carrier is pushed against the guiding surface, in particular, in the radial direction.

According to an embodiment of the disclosure, the force-applying device is adapted to apply the force such that the laboratory sample container carrier is pulled against the guiding surface, in particular, in the radial direction. This enables an easy arrangement of the force-applying device.

According to an embodiment of the disclosure, the force-applying device is adapted to apply the force in a contactless manner, in particular, such that the laboratory sample container carrier is attracted against the guiding surface. This enables an easy embodiment of the force-applying device. In particular, the laboratory sample container carrier may be attractable.

According to an embodiment of the disclosure, the force is a magnetic force. Additionally or alternatively, the force-applying device comprises at least one magnetically active device, in particular, at least one permanent magnet. This enables an easy embodiment of the force-applying device. In particular, the laboratory sample container carrier may comprise at least one magnetically active device, in particular, at least one permanent magnet.

In particular, the force-applying device may comprise a plurality of magnetically active devices, in particular, a plurality of permanent magnets. In particular, the laboratory sample container carrier may not or does not have to roll off at the guiding surface or rotate, respectively, due to different magnetic orientations or alignments, respectively, of the plurality of magnetically active devices. In other words, the plurality of magnetically active devices may not or does not have to be adapted to rotate the laboratory sample container carrier by their different magnetic orientations or alignments, respectively, or alone or directly, respectively.

According to an embodiment of the disclosure, the force-applying device comprises a Halbach array, in particular, extending along the guiding surface. This enables a high magnetic force. In particular, a Halbach array may be a special arrangement of permanent magnets that augments the magnetic field on one side of the array while cancelling the field to near zero on the other side. In particular, this may be achieved by having a spatially rotating pattern of magnetization. Reference is insofar made to the relevant technical literature, the disclosure of which is hereby incorporated herein by reference.

According to an embodiment of the disclosure, the force-applying device extends along the guiding surface, in particular, in the circumferential direction. Additionally or alternatively, the force-applying device is arranged circumferentially or outside, respectively, to the guiding surface, in particular, in the radial direction. This enables an easy embodiment of the force-applying device.

According to an embodiment of the disclosure, the revolving device is adapted to push the laboratory sample container carrier from the entry position to the exit position in the circumferential direction. The guiding surface comprises an entry segment. The force-applying device is arranged and/or the laboratory sample container carrier rolls off after the entry segment in the circumferential direction. Additionally or alternatively, the guiding surface comprises a circular segment. The circular segment comprises a circular shape and/or a distance, in particular, a value of the distance, of the circular segment from a, in particular the, center of the revolving device is constant in the circumferential direction. The force-applying device is arranged and/or the laboratory sample container carrier rolls off at the circular segment. In particular, the circular segment is, in particular directly, after or adjacent to, respectively, the entry segment in the circumferential direction. In particular, the term "start" may be used synonymously for the term "entry". Additionally or alternatively, the entry segment may comprise, in particular only, a non-convex shape. Additionally or alternatively, the entry segment may not or does not have to comprise a circular shape. Additionally or alternatively, the term "form" may be used synonymously for the term "shape". Additionally or alternatively, the entry segment and the circular segment may smoothly transition into each other. Additionally or alternatively, the guiding surface, the entry segment and/or the circular segment may be, in particular only, continuously in the circumferential direction and/or comprise, in particular only, a concave shape.

According to an embodiment of the disclosure, the revolving device is adapted to push the laboratory sample container carrier from the entry position to the exit position in the circumferential direction. The guiding surface surrounds the revolving device in an angle range between 205° (degree) and 290° in the circumferential direction around a, in particular the, center of the revolving device. Additionally or alternatively, the force-applying device surrounds the revolving device in an angle range between 45° and 135° in the circumferential direction around the center of the revolving device. Additionally or alternatively, the entry segment surrounds the revolving device in an angle range between 40° and 70° in the circumferential direction around the center of the revolving device. Additionally or alternatively, the circular segment surrounds the revolving device in an angle range between 165° and 220° in the circumferential direction around the center of the revolving device. This/these value/s enable/s a very reproducible rotation of the laboratory sample container carrier. Thus, this enables a very reproducible orientation or alignment of the laboratory sample container carrier and/or the laboratory sample container. Thus, this enables a very easy handling of the laboratory sample container carrier and/or the laboratory sample container.

According to an embodiment of the disclosure, the guiding surface is roughened and/or corrugated and/or toothed and/or rubberized and/or comprises an increased friction towards the laboratory sample container carrier. This enables a high friction between the laboratory sample container carrier and the guiding surface. Additionally or alternatively, the guiding surface at least partially or completely consists of polyoxymethylene (hereinafter "POM").

According to an embodiment of the disclosure, the laboratory sample container carrier handling apparatus is adapted to be coupled to a, in particular bottom, transport plane of a, in particular the, laboratory sample distribution system, in particular, being adapted to support the laboratory sample container carrier. The laboratory sample container carrier handling apparatus comprises a, in particular bottom, driving surface, in particular, being adapted to support the laboratory sample container carrier. The revolving device is adapted to push the laboratory sample container carrier on top of or in contact with, respectively, the driving surface, in particular, and on top of the transport plane, in particular, at the entry position and/or at the exit position. In particular, the revolving device and/or the driving surface may be adapted such that the transport plane partially may extend under or below, respectively, the revolving device. In other words, the revolving device partially may rotate over the transport plane. Additionally or alternatively, the driving surface may be adapted such that the transport plane may be adjacent to the driving surface. Additionally or alternatively, the driving surface may start at the entry position and/or end at the exit position. Additionally or alternatively, the entry position may be a position at which the laboratory sample container carrier may be received from the transport plane. Additionally or alternatively, the exit position may be a position at which the laboratory sample container carrier may be transferred to the transport plane. Additionally or alternatively, the driving surface may be stationary, in particular, arranged and/or to the transport plane.

The disclosure relates further to a laboratory automation system. The laboratory automation system comprises a, in particular the, laboratory sample distribution system. The laboratory automation system comprises the laboratory sample container carrier handling apparatus as described above. The laboratory sample container carrier handling apparatus is coupled to the laboratory sample distribution system. In particular, the laboratory automation system comprises the, in particular round, laboratory sample container carrier. In particular, the laboratory sample container carrier may be adapted to carry, in particular only, one or more laboratory sample containers. Additionally or alternatively, the laboratory sample container carrier may be adapted as disclosed in EP 2 908 139 A2 or EP 3 456 415 A1, or similar to those laboratory sample container carriers. Additionally or alternatively, the laboratory sample distribution system may be adapted as disclosed in EP 2 773 968 B1. Reference is insofar made to the relevant technical literature, the disclosures of which are hereby incorporated herein by reference.

According to an embodiment of the disclosure, the laboratory automation system comprises the laboratory sample container carrier handling apparatus as described above with respect to coupling to the transport plane. The laboratory sample distribution system comprises the transport plane, in particular, being adapted to support the laboratory sample container carrier. The laboratory sample container carrier handling apparatus is coupled to the transport plane. In particular, the transport plane may be adjacent to the driving surface. Additionally or alternatively, the transport plane and the driving surface may smoothly transition into each other. Additionally or alternatively, the transport plane and the driving surface may be identical to each other. Additionally or alternatively, the transport plane may be adapted as disclosed in EP 2 773 968 B1. Reference is insofar made to the relevant technical literature, the disclosure of which is hereby incorporated herein by reference.

According to an embodiment of the disclosure, the laboratory sample distribution system comprises drive means. The drive means are adapted to move the laboratory sample container carrier on top of or in contact with, respectively, the transport plane. In particular, the transport plane is, in particular directly, adjacent to the driving surface. The drive means are adapted to supply the laboratory sample container carrier to the revolving device and/or to receive the laboratory sample container carrier from the revolving device. Additionally or alternatively, the laboratory sample container carrier comprises at least one magnetically active device, in particular, at least one permanent magnet. The drive means comprise a number of electro-magnetic actuators being stationary arranged in rows and columns below the transport plane. The electro-magnetic actuators are adapted to apply a magnetic force to the laboratory sample container carrier. This enables an efficient exchange of the laboratory sample container carrier between the transport plane and the revolving device. Additionally or alternatively, this enables a smooth and flexible driving of the laboratory sample container carrier. Additionally or alternatively, this enables a multiple use of the at least one magnetically active device of the laboratory sample container carrier, in particular, for the applying of the magnetic force by the force-applying device and for the applying of the magnetic force by the drive means. In particular, the force-applying device and the drive means and/or their functions may be different, in particular, of different kinds, from each other. Additionally or alternatively, the drive means may be adapted as disclosed in EP 2 773 968 B1. Reference is insofar made to the relevant technical literature, the disclosure of which is hereby incorporated herein by reference.

The disclosure relates further to a, in particular the, laboratory automation system. The laboratory automation system comprises the laboratory sample container carrier handling apparatus as described above. The laboratory automation system comprises a laboratory sample container carrier rotating apparatus, in particular comprising a, in particular bottom, rotary plate and/or an optical reader. The laboratory sample container carrier rotating apparatus is adapted to rotate the laboratory sample container carrier, in particular, around itself or its own center, respectively, carrying a, in particular the, laboratory sample container comprising an optically readable identification element into, in particular rotational, alignment of the identification element, in particular with and/or by the optical reader. The laboratory sample container carrier handling apparatus is arranged such that the laboratory sample container carrier carrying the laboratory sample container comprising the optically readable identification element in alignment or rotationally aligned, respectively, rolls off at the guiding surface. Additionally or alternatively, the laboratory automation system comprises a laboratory sample container take over apparatus. The laboratory sample container take over apparatus is adapted to take over the laboratory sample container, in particular, comprising the optically readable identification element in alignment or rotationally aligned, respectively, carried by the laboratory sample container carrier, in particular, while supplied to the revolving device, rolled off at the guiding surface. This enables the alignment and maintaining it. Additionally or alternatively, this enables taking over the laboratory sample container comprising the optically readable identification element in alignment. Thus, this enables a prevention of another alignment. In particular, the term "table" or "disc" may be used synonymously for the term "table". Additionally or alternatively, the optical reader may comprise a barcode scanner and/or the optically readable identification element may be a barcode. Additionally or alternatively, the term "badge" or "label" or "tag" may be used synonymously for the term "element". Additionally or alternatively, the laboratory sample container carrier handling apparatus may be arranged, in particular directly, after or adjacent to, respectively, the laboratory sample container carrier rotating apparatus. Additionally or alternatively, the laboratory sample container take over apparatus may comprise a laboratory sample container pick up apparatus. Additionally or alternatively, laboratory sample container take over apparatus may be arranged after the entry segment and/or at the circular segment, in particular, in the circumferential direction.

The disclosure relates further to a use of the laboratory sample container handling apparatus as described above for handling, in particular, revolving and rolling off, the laboratory sample container carrier in a, in particular the, laboratory automation system, in particular as described above.

In order that the embodiments of the present disclosure may be more readily understood, reference is made to the following examples, which are intended to illustrate the disclosure, but not limit the scope thereof.

Figure 2:
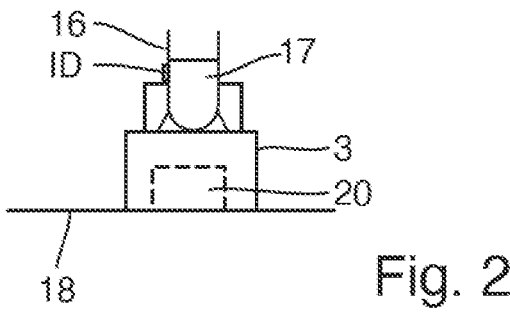
FIG. 2 schematically depicts a cross-sectional side view of a laboratory sample container carrier comprised by the laboratory automation system.

FIG. 1 schematically depicts a top view of a laboratory automation system 100 according to the disclosure. The laboratory automation system 100 comprises a plurality of, in particular round, laboratory sample container carriers 3, one of which is schematically depicted in FIGS. 2 and 5.

Each laboratory sample container carrier 3 is adapted to carry, in particular carries, one laboratory sample container 16. The laboratory sample container 16 comprises a laboratory sample 17 to be analyzed.

Figure 5:
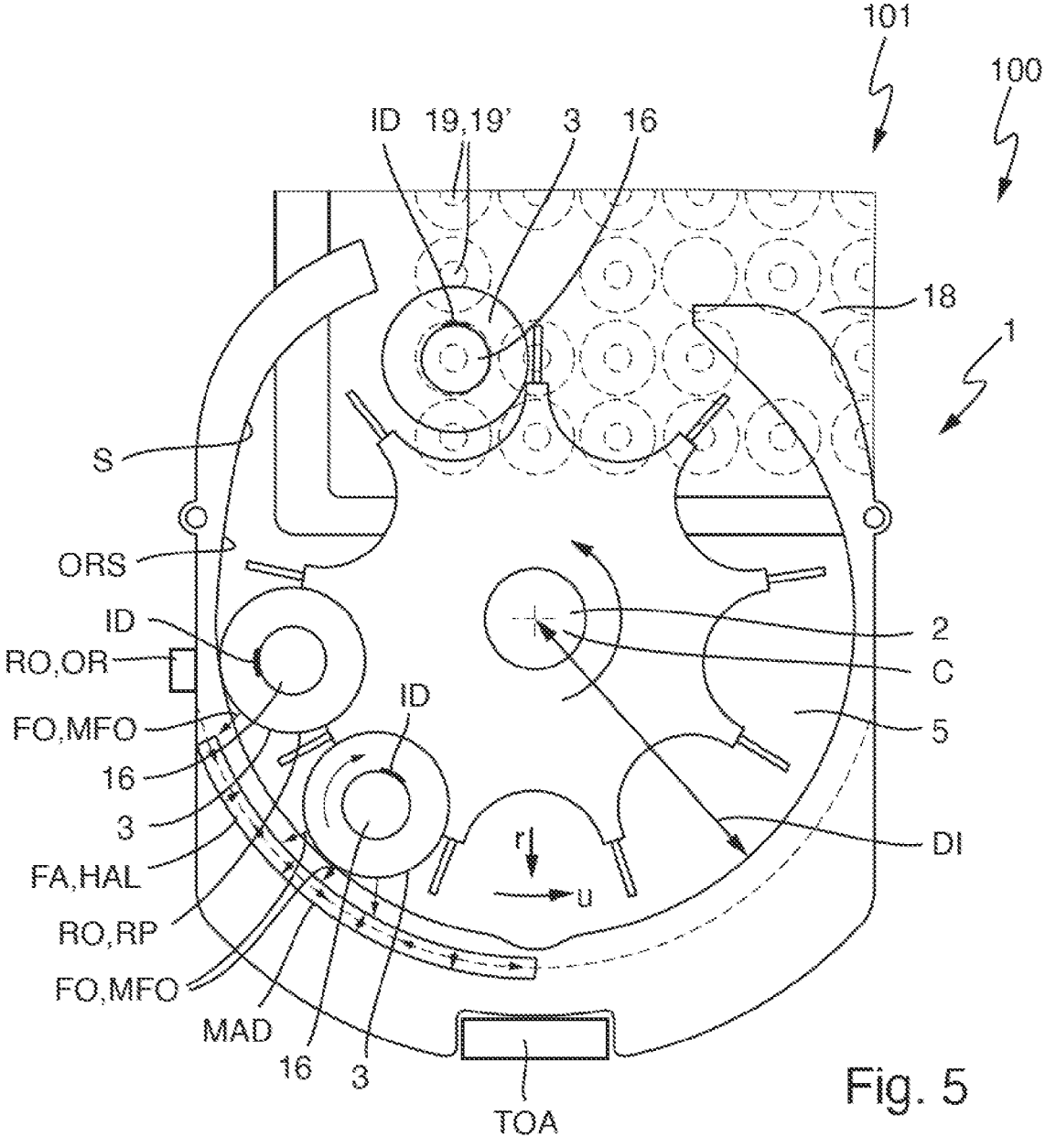
FIG. 5 schematically depicts another top view of the laboratory automation system.

The laboratory automation system 100 further comprises a laboratory sample distribution system 101, which is schematically depicted in FIGS. 1 and 5.

The laboratory sample distribution system 101 comprises a, in particular flat, transport plane 18. The transport plane 18 is adapted to support, in particular supports, the laboratory sample container carriers 3. In other words, the laboratory sample container carriers 3 are placed on top of the transport plane 18.

The laboratory sample distribution system 100 further comprises drive means 19. The drive means 19 are adapted to move, in particular move, the laboratory sample container carrier 3 on top of the transport plane 18.

In detail, the laboratory sample container carrier 3 comprises at least one magnetically active device 20, in particular, at least one permanent magnet, in particular, in a bottom portion of the laboratory sample container carrier 3, which is schematically depicted in FIG. 2. The drive means 19 comprise a number of electro-magnetic actuators 19' being stationary arranged in rows and columns below the transport plane 18. The electro-magnetic actuators 19' are adapted to apply, in particular apply, a magnetic force to the laboratory sample container carrier 3. Thus, the electro-magnetic actuators 19' are adapted to move, in particular move, the sample container carrier 3.

Figure 3:
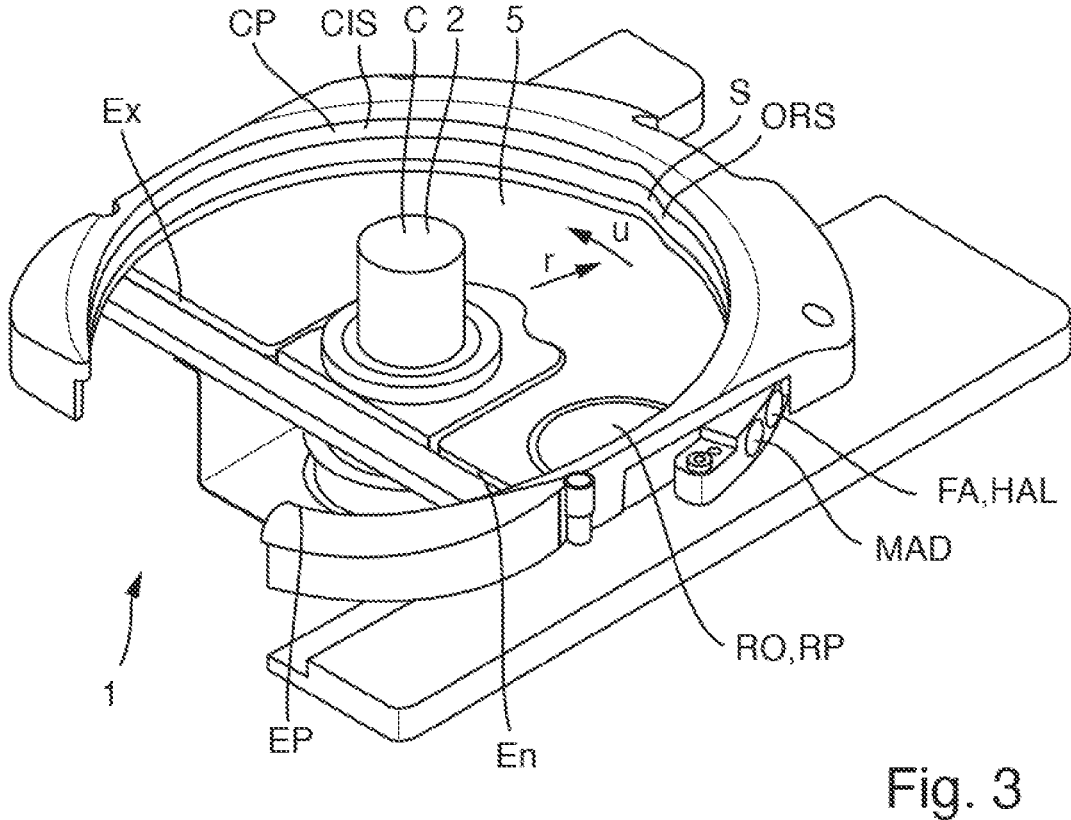
FIG. 3 schematically depicts a perspective view of a laboratory sample container carrier handling apparatus according to the disclosure comprised by the laboratory automation system.
Figure 4:
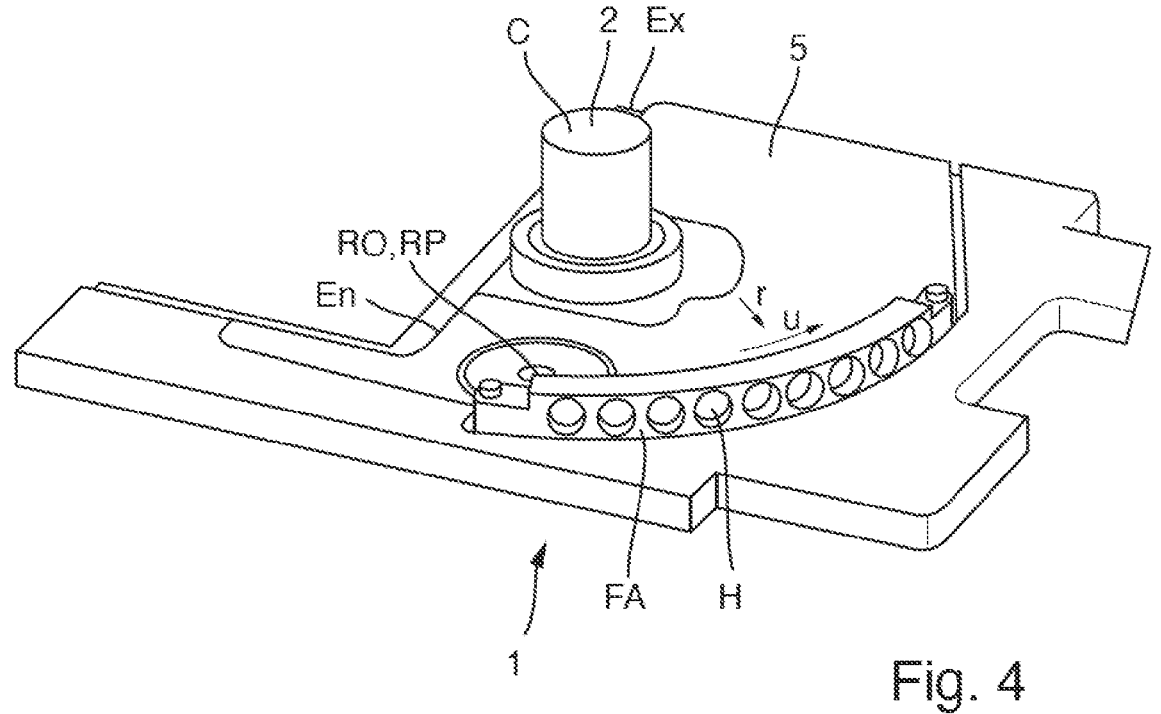
FIG. 4 schematically depicts a perspective view of a part of the laboratory sample container carrier handling apparatus of FIG. 3.

The laboratory sample distribution system 100 further comprises a laboratory sample container carrier handling apparatus 1 according to the disclosure, which is schematically depicted in FIGS. 3 to 5. The laboratory sample container carrier handling apparatus 1 comprises a revolving device 2, wherein in FIGS. 3 and 4 only a part of the revolving device 2 is depicted. The laboratory sample container carrier handling apparatus 1 further comprises a guiding surface S, which is depicted in FIGS. 3 and 5. The guiding surface S comprises an open ring shape ORS partially surrounding the revolving device 2 circumferentially. The revolving device 2 is adapted to push, in particular pushes, the laboratory sample container carrier 3 supplied to the revolving device 2, in particular, from an entry position En to an exit position Ex, along the guiding surface S, in particular, in a circumferential direction u. The laboratory sample container carrier handling apparatus 1 further comprises a force-applying device FA. The force-applying device FA is adapted to apply, in particular applies, a force FO to the laboratory sample container carrier 3 supplied to the revolving device 2 to such an extent that the laboratory sample container carrier 3 is forced against the guiding surface S to such an extent that the laboratory sample container carrier 3 rolls off, in FIG. 5 clockwise, at the guiding surface S pushed by the revolving device 2.

In detail, the laboratory sample container carrier handling apparatus 1 is adapted to be coupled, in particular is coupled, to the laboratory sample distribution system 101, in particular, its transport plane 18.

The laboratory sample container carrier handling apparatus 1 comprises a driving surface 5. The revolving device 2 is adapted to push, in particular pushes, the laboratory sample container carrier 3 on top of the driving surface 5, in particular, and on top of the transport plane 18, in particular, at the entry position En and/or at the exit position Ex.

The transport plane 18 is adjacent to the driving surface 5. The drive means 19 are adapted to supply, in particular supply, the laboratory sample container carrier 3 to the revolving device 2 and/or to receive, in particular receive, the laboratory sample container carrier 3 from the revolving device 2.

The force-applying device FA is adapted to apply, in particular applies, the force FO such that the laboratory sample container carrier 3 is pulled against the guiding surface S.

The force-applying device FA is adapted to apply, in particular applies, the force FO in a contactless manner, in particular, such that the laboratory sample container carrier 3 is attracted against the guiding surface S.

The force FO is a magnetic force MFO.

Additionally or alternatively, the force-applying device FA comprises at least one magnetically active device MAD, in particular, at least one permanent magnet.

In detail, the force-applying device FA comprises a Halbach array HAL, in particular, extending along the guiding surface S.

In particular, the force-applying device FA comprises a plurality of holes H. Each hole H is adapted to receive, in particular receives, a permanent magnet. The permanent magnets are arranged such that they form the Halbach array HAL. The Halbach array has magnetic orientations as depicted in FIG. 5. In other words, each arrow corresponds to one magnetic orientation.

The force-applying device FA extends along the guiding surface S.

Additionally or alternatively, the force-applying device FA is arranged circumferentially to the guiding surface S, in particular, in a radial direction r.

The guiding surface S comprises an entry segment EP. The force-applying device FA is arranged and/or the laboratory sample container carrier 3 rolls off after the entry segment EP in the circumferential direction u.

Additionally or alternatively, the guiding surface S comprises a circular segment CP. The circular segment CP comprises a circular shape CIS and/or a distance DI of the circular segment CP from a center C of the revolving device 2, in particular, in the radial direction r, is constant in the circumferential direction u. The force-applying device FA is arranged and/or the laboratory sample container carrier 3 rolls off at the circular segment CP.

In particular, the circular segment CP is after the entry segment EP in the circumferential direction u.

The guiding surface S surrounds the revolving device 2 in an angle range between 205° and 290°, in particular, of 247.5°, in the circumferential direction u around the center C of the revolving device 2.

Additionally or alternatively, the force-applying device FA surrounds the revolving device 2 in an angle range between 45° and 135°, in particular of 90°, in the circumferential direction u around the center C of the revolving device 2.

Additionally or alternatively, the entry segment EP surrounds the revolving device 2 in an angle range between 40° and 70°, in particular of 55°, in the circumferential direction u around the center C of the revolving device 2.

Additionally or alternatively, the circular segment CP surrounds the revolving device 2 in an angle range between 165° and 220°, in particular of 192.5°, in the circumferential direction u around the center C of the revolving device 2.

The guiding surface S is roughened and/or corrugated and/or toothed and/or rubberized and/or comprises an increased friction towards the laboratory sample container carrier 3.

Additionally or alternatively, the guiding surface at least partially or completely consists of POM.

The laboratory automation system 100 further comprises a laboratory sample container carrier rotating apparatus RO, in particular, comprising a rotary plate RP and/or an optical reader OR. The laboratory sample container carrier rotating apparatus RO is adapted to rotate, in particular rotates, the laboratory sample container carrier 3 carrying the laboratory sample container 16 comprising an optically readable identification element ID into alignment of the identification element ID. The laboratory sample container carrier handling apparatus 1 is arranged such that the laboratory sample container carrier 3 carrying the laboratory sample container 16 comprising the optically readable identification element ID in alignment rolls off at the guiding surface S.

In particular, the laboratory sample container carrier rotating apparatus RO is arranged after the entry position En in the driving surface 5.

Additionally or alternatively, the laboratory automation system 100 further comprises a laboratory sample container take over apparatus TOA. The laboratory sample container take over apparatus TOA is adapted to take over, in particular takes over, the laboratory sample container 16, in particular, comprising the optically readable identification element ID in alignment, carried by the laboratory sample container carrier 3 rolled off at the guiding surface S.

The laboratory sample container handling apparatus 1 is used for handling, in particular revolving and rolling off, the laboratory sample container carrier 3 in the laboratory automation system 100.

What is claimed is:

1. A laboratory sample container carrier handling apparatus comprising:
   a revolving device;
   a guiding surface;
   a force-applying device; and
   a laboratory sample container carrier rotating apparatus, wherein the guiding surface comprises an open ring shape partially surrounding the revolving device circumferentially, wherein the revolving device is adapted to push a laboratory sample container carrier supplied to the revolving device along the guiding surface, wherein the force-applying device is adapted to apply a force to the laboratory sample container carrier supplied to the revolving device to such an extent that the laboratory sample container carrier is forced against the guiding surface to such an extent that the laboratory sample container carrier rolls off at the guiding surface pushed by the revolving device, an optical reader, and wherein the laboratory sample container carrier rotating apparatus is adapted to rotate the laboratory sample container carrier carrying a laboratory sample container comprising an optically readable identification element into alignment of the optical reader, and wherein the laboratory sample container carrier handling apparatus is arranged such that the laboratory sample container carrier carrying the laboratory sample container comprising the optically readable identification element in alignment rolls off at the guiding surface.

2. The laboratory sample container carrier handling apparatus according to claim 1, wherein the force-applying device is adapted to apply the force such that the laboratory sample container carrier is pulled against the guiding surface.

3. The laboratory sample container carrier handling apparatus according to claim 1, wherein the force-applying device is adapted to apply the force in a contactless manner.

4. The laboratory sample container carrier handling apparatus according to claim 3, wherein the laboratory sample container carrier is attracted against the guiding surface.

5. The laboratory sample container carrier handling apparatus according to claim 1, wherein the force is a magnetic force, and/or wherein the force-applying device comprises at least one magnetically active device.

6. The laboratory sample container carrier handing apparatus according to claim 5, wherein the at least one magnetically active device comprises at least one permanent magnet.

7. The laboratory sample container carrier handling apparatus according to claim 1, wherein the force-applying device comprises a Halbach array.

8. The laboratory sample container carrier handling apparatus according to claim 7, wherein the Halbach array is configured to extend along the guiding surface.

9. The laboratory sample container carrier handling apparatus according to claim 1, wherein the force-applying device extends along the guiding surface, and/or wherein the force-applying device is arranged circumferentially to the guiding surface.

10. The laboratory sample container carrier handling apparatus according to claim 1, wherein the revolving device is adapted to push the laboratory sample container carrier from an entry position to an exit position in a circumferential direction, and wherein the guiding surface comprises an entry segment, wherein the force-applying device is arranged and/or the laboratory sample container carrier rolls off after the entry segment in the circumferential direction, and/or wherein the guiding surface comprises a circular segment, wherein the circular segment comprises a circular shape and/or a distance of the circular segment from a center of the revolving device is constant in the circumferential direction, wherein the force-applying device is arranged and/or the laboratory sample container carrier rolls off at the circular segment.

11. The laboratory sample container carrier handling apparatus according to claim 10, wherein the circular segment is after the entry segment in the circumferential direction.

12. The laboratory sample container carrier handling apparatus according to claim 1, wherein the revolving device is adapted to push the laboratory sample container carrier from an entry position to an exit position in a circumferential direction, and wherein the guiding surface surrounds the revolving device in an angle range between 205° and 290° in the circumferential direction around a center of the revolving device, and/or wherein the force-applying device surrounds the revolving device in an angle range between 45° and 135° in the circumferential direction around the center of the revolving device, and/or wherein the entry segment surrounds the revolving device in an angle range between 40° and 70° in the circumferential direction around the center of the revolving device, and/or wherein the circular segment surrounds the revolving device in an angle range between 165° and 220° in the circumferential direction around the center of the revolving device.

13. The laboratory sample container carrier handling apparatus according to claim 1, wherein the guiding surface is roughened and/or corrugated and/or toothed and/or rubberized and/or comprises an increased friction towards the laboratory sample container carrier, and/or wherein the guiding surface at least partially or completely consists of POM.

14. The laboratory sample container carrier handling apparatus according to claim 1, wherein the laboratory sample container carrier handling apparatus is adapted to be coupled to a transport plane of a laboratory sample distribution system, wherein the laboratory sample container carrier handling apparatus comprises a driving surface, and wherein the revolving device is adapted to push the laboratory sample container carrier on top of the driving surface.

15. The laboratory sample container carrier handling apparatus according to claim 14, wherein the revolving device is adapted to push the laboratory sample container carrier on top of the transport plane.

16. A laboratory automation system, wherein the laboratory automation system comprises:

a laboratory sample distribution system, and the laboratory sample container carrier handling apparatus according to claim 1, wherein the laboratory sample container carrier handling apparatus is coupled to the laboratory sample distribution system.

17. The laboratory automation system according to claim 16, wherein the laboratory sample container carrier handling apparatus is coupled to the laboratory sample distribution system and the laboratory sample container carrier.

18. The laboratory automation system according to claim 17, wherein the laboratory sample container carrier is round.

19. The laboratory automation system according to claim 16, wherein the laboratory sample container carrier handling apparatus is adapted to be coupled to a transport plane of a laboratory sample distribution system, wherein the laboratory sample container carrier handling apparatus comprises a driving surface, wherein the revolving device is adapted to push the laboratory sample container carrier on top of the driving surface, wherein the laboratory sample distribution system comprises the transport plane, and wherein the laboratory sample container carrier handling apparatus is coupled to the transport plane.

20. The laboratory automation system according to claim 19, wherein the laboratory sample distribution system comprises drive means, and wherein the drive means are adapted to move the laboratory sample container carrier on top of the transport plane.

21. The laboratory automation system according to claim 20, wherein the transport plane is adjacent to the driving surface, wherein the drive means are adapted to supply the laboratory sample container carrier to the revolving device and/or to receive the laboratory sample container carrier from the revolving device.

22. The laboratory automation system according to claim 20, wherein the laboratory sample container carrier comprises at least one magnetically active device, and wherein the drive means comprise a number of electro-magnetic actuators being stationary arranged in rows and columns below the transport plane, wherein the electro-magnetic actuators are adapted to apply a magnetic force to the laboratory sample container carrier.

23. The laboratory automation system according to claim 22, wherein the at least one magnetically active device is at least one permanent magnet.

24. The laboratory automation system according to claim 16, wherein the laboratory sample carrier rotating apparatus comprises a rotary plate.

25. The laboratory automation system according to claim 16, wherein the laboratory sample container comprises the optically readable identification element in alignment, carrier by the laboratory sample container carrier rolled off at the guiding surface.

* * * * *